(12) United States Patent
Boot

(10) Patent No.: US 8,968,426 B2
(45) Date of Patent: Mar. 3, 2015

(54) LIQUID FUEL COMPOSITION AND THE USE THEREOF

(75) Inventor: Michael Dirk Boot, Eindhoven (NL)

(73) Assignee: Technische Universiteit Eindhoven, Eindhoven (NL)

( * ) Notice: Subject to any disclaimer, the term of this patent is extended or adjusted under 35 U.S.C. 154(b) by 788 days.

(21) Appl. No.: 12/523,253

(22) PCT Filed: Jan. 11, 2008

(86) PCT No.: PCT/NL2008/000014
§ 371 (c)(1),
(2), (4) Date: Sep. 8, 2009

(87) PCT Pub. No.: WO2008/088212
PCT Pub. Date: Jul. 24, 2008

(65) Prior Publication Data
US 2010/0000146 A1    Jan. 7, 2010

(30) Foreign Application Priority Data

Jan. 15, 2007  (NL) .................................... 1033228
Jul. 19, 2007  (NL) .................................... 1034160

(51) Int. Cl.
*C10L 10/06*   (2006.01)
*C10L 10/02*   (2006.01)
*C10L 1/02*   (2006.01)
*C10L 1/185*   (2006.01)
*C10L 1/182*   (2006.01)

(52) U.S. Cl.
CPC ............ *C10L 10/06* (2013.01); *C10L 1/1857* (2013.01); *C10L 1/1824* (2013.01); *C10L 1/026* (2013.01); *C10L 10/02* (2013.01); *Y02E 50/13* (2013.01)

USPC ............................................. 44/349; 44/436

(58) Field of Classification Search
USPC .................................................... 44/349, 436
See application file for complete search history.

(56) References Cited

U.S. PATENT DOCUMENTS

| | | | | |
|---|---|---|---|---|
| 3,594,138 A | | 7/1971 | Badin | .............................. 44/385 |
| 4,365,973 A | * | 12/1982 | Irish | ................................. 44/326 |
| 4,378,973 A | * | 4/1983 | Sweeney | .......................... 44/352 |
| 4,723,963 A | | 2/1988 | Taylor | ................................. 44/57 |
| 5,931,977 A | | 8/1999 | Yang | ................................. 44/320 |
| 6,017,369 A | * | 1/2000 | Ahmed | ............................ 44/302 |
| 6,150,575 A | * | 11/2000 | Angevine et al. | ................ 585/14 |

(Continued)

FOREIGN PATENT DOCUMENTS

| | | |
|---|---|---|
| CN | 1376191 | 10/2002 |
| EP | 188 812 | 7/1986 |

(Continued)

OTHER PUBLICATIONS

Boot, Michael. D., et al., "Oxygenated Fuel Composition Impact on Heavy-Duty Diesel Engine Emission", SAE Paper 2007-01-2018 (JSAE paper 20077293), pub. Jul. 23, 2007, pp. 1929-1943.

*Primary Examiner* — James Goloboy
(74) *Attorney, Agent, or Firm* — Roberts & Roberts, LLP

(57) ABSTRACT

The present invention relates to a liquid fuel composition comprising a mixture of hydrocarbons and a cyclic hydrocarbon compound that suppresses the emission of soot particulates. The present invention also relates to a method for reducing the emission of soot particulates in the exhaust gases of an internal combustion engine. It is desirable for the cyclic hydrocarbon compound to contain one or more oxygen atoms.

18 Claims, 1 Drawing Sheet

(56) References Cited

U.S. PATENT DOCUMENTS

| | | |
|---|---|---|
| 6,447,557 B1 | 9/2002 | Yeh et al. ......................... 44/437 |
| 6,447,558 B1 | 9/2002 | Yeh et al. ......................... 44/437 |
| 6,458,176 B2 | 10/2002 | Yeh et al. ......................... 44/437 |
| 6,890,364 B2 | 5/2005 | Delfort et al. ................... 44/349 |
| 7,014,668 B2 | 3/2006 | Golubkov et al. .............. 44/438 |
| 2002/0000063 A1* | 1/2002 | Yeh et al. ......................... 44/437 |
| 2002/0026744 A1* | 3/2002 | Golubkov et al. .............. 44/436 |
| 2002/0108299 A1 | 8/2002 | Yeh et al. ......................... 44/439 |
| 2008/0029057 A1* | 2/2008 | Hergart et al. ............. 123/198 F |

FOREIGN PATENT DOCUMENTS

| | | |
|---|---|---|
| EP | 0 905 217 | 3/1999 |
| EP | 1 321 502 | 6/2003 |
| JP | 07 331262 | 12/1995 |
| KR | 100 321 477 | 1/2002 |
| WO | WO 95/20637 | 8/1995 |
| WO | WO 01/18155 | 3/2001 |
| WO | WO 01/46349 | 6/2001 |
| WO | WO 01/53437 | 7/2001 |
| WO | WO 0188066 A1 * | 11/2001 |

* cited by examiner

LIQUID FUEL COMPOSITION AND THE USE THEREOF

The present invention relates to the use in a liquid fuel composition comprising a mixture of hydrocarbons of at least a compound that suppresses the emission of soot particulates. The present invention also relates to a method for reducing the emission of soot particulates in the exhaust gases of an internal combustion engine, and to such a liquid fuel composition.

Known from U.S. Pat. No. 4,378,973 is a diesel fuel composition in which, in order to reduce the emission of soot particulates, is incorporated a mixture of cyclohexane with at least one oxygenated compound, the amount of cyclohexane amounting to 0.5-5.0 wt. % and the amount of oxygenated compound to between 0.5 and 5.0 wt. %. Mentioned as examples of suitable oxygenated compounds are isobutyl heptyl ketone, acetone, tetrahydrofuran, 1,2-butylene oxide, dimethyl ether, propionaldehyde, ethanol, 2-ethylhexanol or a mixture of primary alcohols containing between 6 and 20 carbon atoms. The explanation provided in the aforementioned US patent is that the oxygenated compounds burn cleaner than the hydrocarbon fuel, as a result of which the particulates formed in the combustion will be smaller and more polar than the particulates obtained in the combustion of the hydrocarbon fuel itself. It is subsequently assumed that the attachment of such a polar particulate to a particulate formed in the combustion of the hydrocarbon fuel will yield a polar particulate that will tend to resist conglomeration with larger particulates, the result of which will be downsizing of the average particulate size of the soot particulates. Cyclohexane is volatile and rich in hydrogen atoms, which, it is claimed, will ensure early, steady combustion of the fuel composition during injection of the fuel. It is claimed that the combination of the early, steady combustion effected by cyclohexane and the polarisation of the particulates by the oxygen-rich additives in a synergistic manner effects a reduction in particulates.

U.S. Pat. Nos. 6,458,176, 6,447,557 and 6,447,558 disclose a diesel fuel composition in which, in order to reduce the emission of soot particulates, is incorporated an oxygenated compound in an amount such that a minimum percentage by weight of oxygen is added to the overall fuel composition, in particular at least 2.0 wt. % oxygen. Mentioned as examples of suitable oxygenated compounds are inter alia saturated aliphatic monovalent primary, secondary or tertiary alcohols with an average of 9-20 carbon atoms, such as octanol, hexanone, nonanol, stearyl alcohol, in particular ketone compounds containing 5-21 carbon atoms. It is assumed that the emission of soot particulates is caused by incomplete combustion of the fuel, and the aim is therefore to increase the oxygen value of the fuel to facilitate the combustion. The aforementioned three US patents disclose experimental data relating to isodecanol, isononanol, dimethyl heptanol, dimethyl octanol and dimethyl heptanone, which experimental results indicated that the aforementioned secondary and tertiary alcohols and ketone show a reduction in the emission of soot particulates corresponding to that of a primary alcohol compound.

JP 07 331262 relates to a fuel composition for a diesel engine that is capable of reducing particulate substances contained in the black smoke emitted to the atmosphere, which composition comprises an oxygenated compound such as a derivative of a carboxylic ester, a glycol ether or glycol ester or an oxygenated heterocyclic compound, the cyclic compound's ring structure consisting of four carbon atoms and two oxygen atoms, the oxygen atoms being separated from one another by one or two carbon atoms.

U.S. Pat. No. 3,594,138 relates to a liquid fuel composition comprising a Group II-A metal salt of an alkanoic acid and an alkyl ether of glycol with 3 to 10 carbon atoms, which metal salt is present in an amount of about 0.01 to 2 wt. %, relative to the total weight of the fuel mixture. Barium, strontium and calcium are mentioned as suitable metals.

U.S. Pat. No. 5,931,977 relates to a compound intended for use as an additive for a diesel fuel, the additive containing 30-55% alcohol, 25-35% ketone compounds and 3-10% silicon compounds, the alcohol consisting of methanol, n-butanol and benzyl alcohol, and the ketone compound being 20-25% cyclohexanone and 6-10% methyl ethyl ketone.

Korean patent application KR 100 321 477 relates to a fuel composition that contains 1,3-dioxane derivatives for the purpose of the removal of particulates emitted by a diesel engine. The dioxane compounds mentioned in the aforementioned Korean publication can be described as cyclic hexagonal compounds, with the ring structure containing two oxygen atoms and four carbon atoms.

European patent application EP 1 321 502 relates to a diesel fuel composition that contains an additive, notably at least a glycerol acetal, the acetal compounds being characterised by a cyclic compound consisting of five atoms, with the ring structure of the cyclic compound containing two oxygen atoms in addition to three carbon atoms, or a cyclic compound consisting of six atoms, with the ring structure of the cyclic compound containing four carbon atoms in addition to two oxygen atoms.

European patent application EP 1 188 812 relates to a diesel fuel that contains a tetrahydrofurfuryl derivative that is characterised by a cyclic compound whose ring structure contains an oxygen atom in addition to four carbon atoms. The aforementioned compound must also contain a branch, with a carbon atom of the ring being directly bound to a carbon atom that is bound to an oxygen atom to which is attached an alkyl group, which alkyl group may also contain an oxygen atom.

Known from International application WO 01/18155 is a fuel composition, between 5 and 100% of which consists of a group of nine oxygen-containing organic compounds, which fuel composition must always contain at least four different oxygen-containing functional groups chosen from the aforementioned group of nine members, which groups must be divided between at least two different oxygen-containing compounds. The examples disclosed in this document show predominantly aliphatic hydrocarbon compounds, with a ring structure consisting of four carbon atoms being used only in, inter alia, examples 2, 5, 12, 14 and 15.

European patent application EP 0 905 217 relates to an unleaded gasoline for a gasoline engine that contains an oxygen-containing compound with 2-15 carbon atoms, with butyl lactone being mentioned as the oxygen-containing compound.

International application WO 95/20637 relates to a very broad, generally defined hydrocarbon composition, but it is not unambiguously specified what compounds are to be regarded as essential components.

International application WO 01/53437 relates to a method of reducing the vapour pressure of a fuel mixture for spark-ignition engines, notably gasoline engines, according to which an oxygen-containing compound is added to the fuel in an amount of at least 0.05 vol. % of the total fuel mixture.

The diesel fuel commonly used for transport purposes is a mixture consisting of predominantly, i.e. approximately 75 wt. %, saturated hydrocarbon compounds, the key constituent of which consists of n-paraffins. The term 'saturated' used in this context refers to the maximum number of hydrogen atoms for a specific carbon skeleton. In other words, a saturated hydrocarbon compound is characterised by the absence of double or multiple carbon-carbon bonds. Naphthene and also iso-paraffins, the remaining saturated compounds, and also olefins are moreover found in diesel fuels in only sporadic quantities. Aromatic compounds in which single ring bonds prevail over aromatic compounds consisting of several rings constitute the remaining 25 wt. %.

The emission of soot particulates formed in the combustion of fuels in a fuel engine is considered undesirable. These particulates are regarded as harmful substances. European legislation demands the reduction of the emission of soot particulates in the coming years.

The aim of the present invention is therefore to provide a liquid fuel composition that suppresses the soot-formation process during its use, and consequently emits a reduced quantity of particulate combustion products.

Another aim of the present invention is to provide a liquid fuel composition that shows a reduced emission of soot particulates without the performance of the fuel engine being adversely affected.

Yet another aim of the present invention is to provide a liquid fuel composition which, if used in a fuel engine, does not cause undesired wear of the engine parts.

Another aim of the present invention is to provide a liquid fuel composition that suppresses the emission of soot, in particular in a diesel engine, with EGR (exhaust gas recycling) taking place to suppress the emission of NOx, with it being in particular desirable to simultaneously suppress the emission of soot and the emission of NOx.

The present invention is characterised in that the compound is a cyclic hydrocarbon compound whose ring contains at least five carbon atoms, which compound contains at least an oxygen atom.

One or more of the aforementioned aims can be met by using such a liquid fuel composition. In a particular embodiment of the present invention it is desirable for the cyclic hydrocarbon compound to have one or more branches, which branches may optionally be an aliphatic hydrocarbon group and may optionally be cyclic, or a combination of the two. The number of at least 5 carbon atoms in the ring structure is desired to guarantee the compound's stability, with the volatility of the cyclic hydrocarbon compound also playing a role, in particular from the viewpoint of the user's safety. A quantity of at most 20 carbon atoms in the ring structure is preferable from the viewpoint of the solubility of the cyclic hydrocarbon compound in the intended fuel. The present cyclic hydrocarbon compound must moreover be seen as a compound that consists exclusively of a combination of C, H, and O atoms, with there being no question of the cyclic hydrocarbon compound containing one or more of the group comprising metals, silicon, phosphorus and nitrogen atoms. The bond between the carbon atoms in the ring may be single, double or aromatic. When the ring contains at least an oxygen atom, the bond between the oxygen and the adjacent carbon will be single. The ring may have one or more branches, which branches may contain one or more oxygen atoms. A branch without oxygen atoms is also possible. The structure of the branch is linear, branched or cyclic, or a combination thereof. If the oxygen atom is outside the ring, the bond between the oxygen and the carbon may be either single, as in for example cyclohexanol, or double, as in for example cyclohexanone.

A particularly favourable compound that suppresses the emission of soot particulates is a cyclic hydrocarbon compound that contains one or more oxygen atoms, the one or more oxygen atoms in particular being contained outside the ring.

The quantity of cyclic hydrocarbon compound contained in the liquid fuel composition is at least 5 wt. %, preferably at least 10 wt. %, in particular at least 30 wt. %, relative to the total weight of the liquid fuel composition.

The present inventor has discovered that cyclohexanone is a particularly good compound that suppresses the emission of soot particulates and moreover prevents the formation of NOx.

In addition to cyclohexanone and cyclopentanol, the following can be mentioned as suitable compounds that meet one or more of the aims of the present invention: tetrahydropyran, cyclohexanol, cyclohexenol, phenol, cyclohexyl methanol, anisole, methoxycyclopentane, 3,5-dimethyl cyclohexanol, 2-isopropyl cyclohexanol and dicyclohexyl ether.

The present liquid fuel composition is more or less organic in nature and the cyclic hydrocarbon compound does not require the presence of metal salts such as barium, strontium and calcium to ensure a good performance, as disclosed in U.S. Pat. No. 3,594,138. Any salts present are to be regarded as unavoidable impurities deriving from the starting materials and will in certain embodiments amount to at most 0.01 wt. %, in particular at most 0.005 wt. %, relative to the weight of the total liquid fuel composition.

The present liquid fuel composition is further characterised in that the concentration of silicon compounds in the liquid fuel composition is at most 3%; silicon oil, ethyl silicate and combinations thereof can be quoted as examples.

The present cyclic hydrocarbon compound suppressing the emission of soot particulates must be soluble in the liquid fuel composition. It is also desirable for the cyclic hydrocarbon compound to show boiling behaviour that is comparable with that of the fuel composition in which the compound is dissolved. The following can be mentioned as suitable liquid fuel compositions in which the present cyclic hydrocarbon compound can be used: diesel fuel, jet fuel, kerosine, gasoline, bunker fuel and mixtures hereof. Synthetic or Fischer-Tropsch fuels can also be mentioned as liquid fuel compositions, and also vegetable oils and so-termed biofuels.

The liquid fuel composition according to the present invention may contain one or more of the usual additives, such as agents affecting flow at low temperatures, agents suppressing the precipitation of waxy components, stabilisers, antioxidants, agents for improving the cetane number, agents for promoting combustion, detergents, defoaming agents, lubricants, antifoaming agents, antistatic agents, agents for promoting conductivity, corrosion-suppressing agents, fragrances, pigments, friction-reducing agents and the like.

In addition to the aforementioned compounds the liquid fuel composition may also contain the usual agents commercially employed for suppressing the emission of soot particulates, notably so-termed oxygen-containing compounds, also known as oxygenates. The additives commonly used to reduce the emission of nitrogen oxides may also be used in the present liquid fuel composition.

In particular, the present invention focuses on the use of the present cyclic hydrocarbon compound in so-termed compression-ignition (CI) engines, in particular diesel engines, as opposed to so-termed spark-ignition (SI) engines, in particular gasoline engines, for which the present cyclic hydrocarbon compound is unsuitable.

Intensive research has shown that it is possible to reduce the concentration of soot particulates in off-gas without the concentration of nitrogen oxides in the off-gas being increased or even being lowered, it being preferable for the liquid fuel composition to have a cetane number of 10-40, in particular 15-35.

The cetane number is a value indicating a fuel's knocking tendency, usually for a diesel engine, but said cetane number also holds for other fuels and has a function like the octane number in the case of gasoline. The cetane number of cetane is 100 and the cetane number of α-methylnaphthalene is 0. A mixture of the two components has a cetane number corresponding to the volume percentage of cetane in the mixture. The cetane number of the most commonly used diesel fuel mixtures is between 44.2 and 51.8. At a cetane number of less than 10 the self-ignition time is delayed too much. The cetane number of gasoline fuel mixed with ethanol is usually negative or about 0. Substances are often added to the base fuel to increase the cetane number so as to arrive at faster combustion. On the basis of what has now been discovered it has however been decided to ensure that the cetane number remains below 40. The cetane number (CN) characterises a fuel's self-ignition behaviour. A lower CN value corresponds to a lower fuel reactivity and a longer ignition delay. The cetane numbers of tripropylene glycol monomethyl ether and di-n-butyl maleate (TP and DB) are 75 and 30, respectively. The cetane number of cyclohexanone is about 16. In order to reduce the cetane number of the fuel mixture to below 40 it is hence preferable to use an oxygen compound of a cyclic hydrocarbon. When use is made of an oxygen compound of a non-cyclic hydrocarbon the cetane number can be reduced to below 40 by adding substances known per se that have a cetane number such that the value of the overall fuel mixture drops to below 40.

The inventor found that at 25% exhaust gas recirculation (EGR) the emission of soot particulates at a cetane number of 34.6 was substantially lower than at cetane numbers of 46.3 and 53.9, and that the concentration of nitrogen oxides was at the same time also lower (employed engine: DAF 9.2 liters (heavy-duty diesel engine) at 25% EGR without after-treatment, determined relative to EURO V (European emission standard as at 10-2008 for "heavy-duty diesel vehicles")).

Particular embodiments of the present liquid fuel composition are represented in the included claims.

The present invention will be illustrated with reference to a number of examples below, to which it should however be added that the present invention is by no means restricted to such particular examples.

Figure 2:
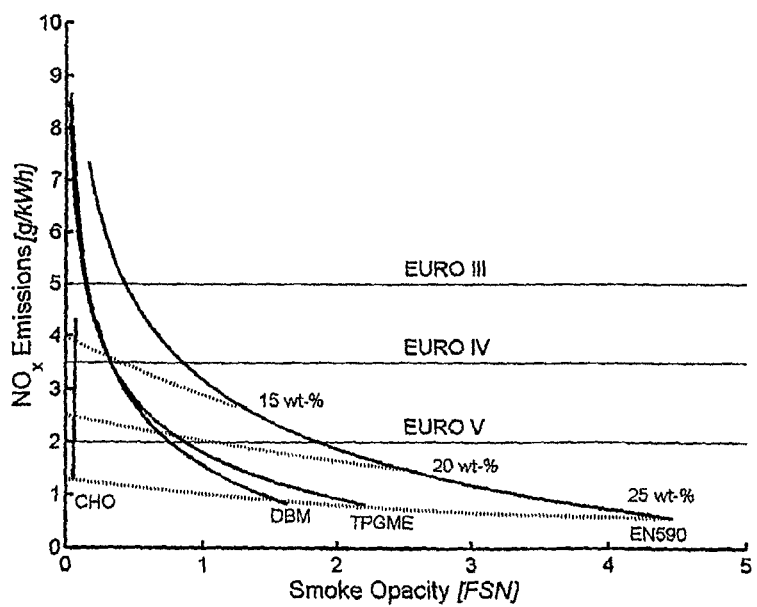
FIG. 2 shows the behaviour of cyclohexanone in relation to a number of commercially available oxygen-containing compounds that are commonly used to reduce the emission of soot particulates, which oxygen-containing compounds do not have a cyclic structure.

Three additives were investigated and each was mixed with a commercially available diesel fuel, notably EN590 diesel with a low sulphur content, in order to obtain 9 wt. % oxygen in each fuel mixture ultimately obtained, which ratio holds for FIG. 2. In this way three mixtures were obtained, each containing a different additive, the mixtures ultimately obtained being comparable because they all corresponded to 9 wt. % oxygen. The aforementioned ratio was chosen because that value corresponds to a mixture of diesel fuel and cyclohexanone that contains 9 wt. % oxygen, so that the performance could be compared with that of two "standard" oxygen-containing additives commonly used to reduce the emission of soot particulates, notably TPGME (tripropylene glycol monomethyl ether) and DBM (dibutyl maleate). The following measurements were carried out to measure the emission values, in particular NOx, HC, CO and soot: chemiluminescence (CL), flame ionisation detection (FID), non-dispersive infrared (NDIR) detection and filter smoke number (FSN) measurement. The particulate emission was inferred from the smoke values. The engine used for the tests was a DAF PE235C 4V engine; the experiments were carried out at a partial-load working point characteristic of a vehicle speed of about 80 km/hour.

Figure 1:
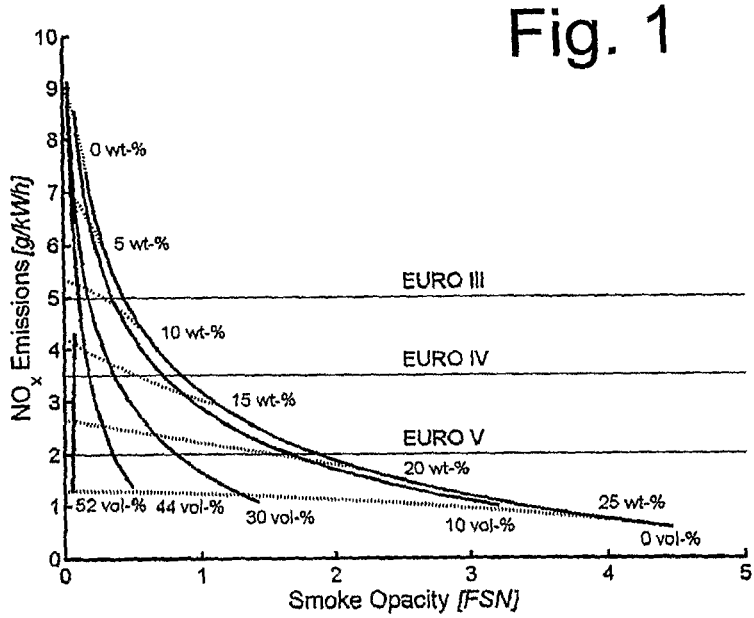
FIG. 1 shows the effect of exhaust gas recirculation (EGR) and cyclohexanone content on NOx emission and the degree or intensity of the soot.

FIG. 1 represents the effect of exhaust gas recirculation (EGR) and cyclohexanone concentration on the NOx emission (represented along the Y axis) and the degree or intensity of the soot (represented along the X axis). The dotted lines represent constant wt. % EGR. The curves represented as solid lines relate to vol. % cyclohexane. From this FIG. 1 it follows that the mixture of diesel fuel and cyclohexanone led to higher NOx values than the diesel fuel without cyclohexanone, notably zero volume % CHO.

The present inventor assumes that this behaviour is attributable to longer ignition delays, faster combustion and finally higher peak flame temperatures. The present inventor also assumes that the degree of NOx formation approximately increases exponentially with the flame temperature. The figure also indicates the European emission targets for NOx, notably EURO III, EURO IV and EURO V. Depending on the chosen cyclohexanone concentration it is clear that the NOx target of type EURO V is achieved when the employed EGR value is in the range of 17.5-22.5 wt. %. From this it consequently follows that EGR is a good way of reducing NOx emissions. The addition of cyclohexanone appears to substantially reduce the disadvantage of greatly increased soot emission occurring in EGR, because no increased soot emission is observed in the case of cyclohexanone at the same oxygen concentration. So the addition of cyclohexanone makes it possible to bring the emission of NOx within the EURO V range by means of EGR without there being any question of increased soot emission. This favourable effect is not observed in the case of the commonly used agents TPGME and DBM.

FIG. 2 shows the behaviour of cyclohexanone in comparison with that of the commercially available oxygen-containing compounds that are commonly used to reduce the emission of soot particulates The oxygen concentration in the liquid fuel composition was chosen to be constant in the mixtures of cyclohexanone (CHO), dibutyl maleate (DBM) and tripropylene glycol monomethylether (TPGME); in particular, the oxygen concentration was 9%, based on weight. The dotted lines in FIG. 2 represent constant wt. % EGR. The curves represented as solid lines relate to the different fuels. A clear positive influence on the emission of soot is observed even at lower oxygen concentrations (see FIG. 1). The emission or concentration of soot particulates in exhaust gas, also referred to as PM emission, as measured is expressed in the blackness of the exhaust gas in a range of 0-10, with 0 corresponding to an emission of no particulates and 10 corresponding to black smoke. It should be added that the commonly used oxygen-containing compounds DBM and TPGME are in the literature often referred to as compounds that show particularly good behaviour in the field of the reduction of the emission of soot particulates.

The present inventor attributes the behaviour of cyclohexanone with respect to reducing the emission of soot particulates, which behaviour is superior to the behaviour of DBM and TPGME, as can be seen in FIG. 2, to the ignition behaviour of the fuels. The present inventor is however by no means bound to such an explanation. The soot-formation process that is responsible for soot emission is strongly opposed when the air and fuel are better mixed. The ignition delay, which is the time between the beginning of the injection process and the moment of self-ignition, of the mixture to be formed is lengthened due to the cyclic character of the present cyclic hydrocarbon compound. As a result, more time becomes available for the mixing process and the oxygen concentration in the soot-synthesis zone will in all probability be higher than in the case of mixtures with a shorter ignition delay, such as mixtures based on DBM and TPGME.

A possible explanation for the use of cyclohexanone is the assumption that, if incorporated in the predominantly hexagonal structure of soot precursors (polyaromatic hydrocarbons, PAHs), cyclic hydrocarbons with five (or to a lesser degree seven) carbon atoms, notably pentagons and septagons, respectively, will cause curvature. With the PAHs consequently being curved, the transition to soot crystals (stacked PAH plates) will proceed less readily. It is assumed that pyrolysis causes cyclohexanone to (partly) decompose into inter alia the aforementioned pentagons. Cyclic hydrocarbons tend to remain cyclic; so even larger molecules such as octagons will in part form the desired pentagons. A hexagonal hydrocarbon compound such as cyclohexanone is preferable from an economic perspective because hexagonal hydrocarbons (though without oxygen bonds) are already present in large quantities in crude oil and also have the most stable configuration. The present inventor is however by no means bound to such an explanation.

The invention claimed is:

1. A method for suppressing the emission of soot particulates formed by combustion of a liquid fuel composition in a compression-ignition engine, comprising combusting a mixture of hydrocarbons for a compression-ignition engine, and which liquid fuel composition has a cetane number of 15-35, the method comprising adding to the liquid fuel composition a cyclic hydrocarbon compound whose ring contains at least five carbon atoms, which compound contains at least one oxygen atom.

2. The method according to claim 1, wherein the cyclic hydrocarbon compound has one or more branches, which branches may optionally be an aliphatic hydrocarbon group or optionally cyclic, of a combination of the two.

3. The method according to claim 1 wherein the at least one oxygen atom is contained in the ring.

4. The method according to claim 1 wherein the at least one oxygen atom is outside the ring.

5. The method according to claim 4, wherein the cyclic hydrocarbon compound comprises cyclohexanone or cyclopentanol.

6. The method according to claim 5, wherein the cyclic hydrocarbon compound comprises cyclohexanone.

7. The method according to claim 3, wherein the cyclic hydrocarbon compound is tetrahydropyran.

8. The method according to claim 1 wherein the amount of cyclic hydrocarbon compound contained in the liquid fuel composition is at least 5 wt. %, relative to the weight of the total liquid fuel composition.

9. The method according to claim 8, wherein the amount of cyclic hydrocarbon compound contained in the liquid fuel composition is at least 10 wt. %, relative to the weight of the total liquid fuel composition.

10. The method according to claim 9, wherein the amount of cyclic hydrocarbon composition contained in the liquid fuel composition is at least 30 wt. %, relative to the weight of the total liquid fuel composition.

11. The method according to claim 1 wherein the liquid fuel composition comprises diesel fuel, jet fuel, kerosine, gasoline, synthetic or Fischer-Tropsch fuels, vegetable oils, biofuels, bunker fuel or mixtures hereof.

12. The method according to claim 1 wherein the cyclic hydrocarbon compound comprises C, H and O atoms, with no N and P atoms, metals and silicon or combinations hereof being contained in the cyclic hydrocarbon compound.

13. A method for reducing the emission of soot in exhaust gases of a compression-ignition engine comprising the supply to and the combustion in the compression-ignition engine of a liquid fuel composition, which liquid fuel composition comprises a mixture of hydrocarbons for a compression-ignition engine, and which liquid fuel composition has a cetane number of 15-35, method comprising adding to the liquid fuel composition a cyclic hydrocarbon compound whose ring contains at least five carbon atoms, which compound contains at least one oxygen atom.

14. The method of claim 1, wherein the cyclic hydrocarbon compound comprises cyclohexanone.

15. The method of claim 1, wherein the cyclic hydrocarbon compound comprises cyclopentanol.

16. The method of claim 1, wherein the cyclic hydrocarbon compound comprises tetrahydropyran.

17. The method of claim 1, wherein the amount of cyclic hydrocarbon compound contained in the liquid fuel composition is at least 30 wt. %, relative to the weight of the total liquid fuel composition.

18. The method of claim 17 wherein the cyclic hydrocarbon compound comprises cyclohexanone.

* * * * *